(12) United States Patent
Sperber et al.

(10) Patent No.: US 7,921,280 B2
(45) Date of Patent: Apr. 5, 2011

(54) SELECTIVELY POWERED RETIREMENT UNIT USING A PARTITIONED ALLOCATION ARRAY AND A PARTITIONED WRITEBACK ARRAY

(75) Inventors: Zeev Sperber, Zichron Yackov (IL); Rafi Marom, Haifa (IL); Ofer Levy, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 12/215,526

(22) Filed: Jun. 27, 2008

(65) Prior Publication Data

US 2009/0327663 A1 Dec. 31, 2009

(51) Int. Cl.
*G06F 9/30* (2006.01)

(52) U.S. Cl. .................................. 712/218; 713/324

(58) Field of Classification Search .................. None
See application file for complete search history.

(56) References Cited

U.S. PATENT DOCUMENTS

| | | | | |
|---|---|---|---|---|
| 5,751,985 A * | 5/1998 | Shen et al. | ...... | 712/218 |
| 5,873,118 A * | 2/1999 | Letwin | ...... | 711/156 |
| 5,889,982 A * | 3/1999 | Rodgers et al. | ...... | 712/229 |
| 5,938,760 A * | 8/1999 | Levine et al. | ...... | 712/220 |
| 5,938,761 A * | 8/1999 | Patel et al. | ...... | 712/238 |
| 6,047,369 A * | 4/2000 | Colwell et al. | ...... | 712/217 |
| 6,108,769 A * | 8/2000 | Chinnakonda et al. | ...... | 712/216 |
| 6,615,343 B1 * | 9/2003 | Talcott et al. | ...... | 712/244 |
| 6,757,892 B1 * | 6/2004 | Gokhale et al. | ...... | 717/161 |
| 7,096,345 B1 * | 8/2006 | Chen et al. | ...... | 712/218 |
| 7,167,989 B2 | 1/2007 | Sperber et al. | ...... | 713/310 |
| 7,472,260 B2 * | 12/2008 | Lien et al. | ...... | 712/225 |
| 7,502,817 B2 * | 3/2009 | Ryan | ...... | 709/200 |
| 7,747,841 B2 * | 6/2010 | Martinez et al. | ...... | 712/218 |
| 2002/0029357 A1 * | 3/2002 | Charnell et al. | ...... | 714/9 |
| 2002/0144094 A1 * | 10/2002 | Burch | ...... | 712/218 |
| 2002/0144095 A1 * | 10/2002 | Burch | ...... | 712/218 |
| 2002/0144096 A1 * | 10/2002 | Burch | ...... | 712/218 |
| 2003/0056067 A1 * | 3/2003 | Lawrence | ...... | 711/156 |
| 2003/0126410 A1 | 7/2003 | Savransky et al. | | |
| 2004/0123066 A1 * | 6/2004 | Liron et al. | ...... | 711/200 |
| 2004/0128484 A1 | 7/2004 | Sperber et al. | ...... | 712/218 |
| 2005/0050303 A1 * | 3/2005 | Rosner et al. | ...... | 712/218 |
| 2005/0081067 A1 * | 4/2005 | Sperber et al. | ...... | 713/300 |
| 2005/0138335 A1 | 6/2005 | Samra et al. | | |
| 2007/0157006 A1 | 7/2007 | Jourdan et al. | | |
| 2008/0072015 A1 | 3/2008 | Julier et al. | | |

(Continued)

OTHER PUBLICATIONS

Ponomarev et al. (Energy-Efficient Design of the Reorder Buffer); PATMOS '02 Proceedings of the 12th International Workshop on Power and Timing Modeling, Optimization and Simulation; Sep. 2002, 10 pages.*

(Continued)

*Primary Examiner* — Eddie P Chan
*Assistant Examiner* — Keith Vicary
(74) *Attorney, Agent, or Firm* — Trop, Pruner & Hu, P.C.

(57) ABSTRACT

In one embodiment, the present invention includes a retirement unit to receive and retire executed instructions. The retirement unit may include a first array to receive information at allocation and a second array to receive information after execution. The retirement unit may further include logic to calculate an event associated with an executed instruction if information associated with the executed instruction is stored in an on-demand portion of at least one of arrays. Other embodiments are described and claimed.

20 Claims, 4 Drawing Sheets

U.S. PATENT DOCUMENTS

2008/0148282 A1    6/2008  Sodani et al.
2010/0017638 A1*   1/2010  Ghose .......................... 713/324
2010/0131742 A1*   5/2010  Col et al. ...................... 712/220

OTHER PUBLICATIONS

Brooks et al. (Power-Aware Microarchitecture: Design and Modeling challenges for Next-Generation Microprocessors); IEEE Micro, Nov./Dec. 2000, vol. 20, Issue 6, pp. 26-44.*

Kucuk et al. (Distributed Reorder Buffer Schemes for Low Power); This paper appears in: Computer Design, 2003. Proceedings. 21st International Conference on; Issue Date: Oct. 13-15, 2003; 7 pages.*

PCT/US2009/047613 International Search Report with Written Opinion of the International Searching Authority mailed Jan. 13, 2010.

Patent Office of the Russian Federation, Official Action issued Sep. 29, 2010 in Russian application No. 2009124521.

German Patent Trademark Office, Examination Request mailed on Oct. 21, 2010 in German patent No. 10 2009 029 852.5-53.

Dmitry Ponomarev, et al. "Energy-Efficient Design of the Recorder Buffer,"Proceedings of the 12th International Workshop on Integrated Circuit Design. Power and Time Modeling, Optimization and Simulation, 2002, pages 289-299.

* cited by examiner

SELECTIVELY POWERED RETIREMENT UNIT USING A PARTITIONED ALLOCATION ARRAY AND A PARTITIONED WRITEBACK ARRAY

BACKGROUND

Modern microprocessors are formed of various stages that receive instructions, execute the instructions, and provide results of the instructions. Many modern architectures are based on an out-of-order (OOO) implementation in which instructions can be executed out of order and the results are later committed to an architectural state of the processor in order.

To realize such out of order operation, the processor pipeline can be segmented into various stages. At a conclusion of processing of instructions in such stages, a retirement stage may operate to confirm that the results of the execution are valid, i.e., are not speculative or based on incorrect data, and that no faults or exceptions occurred. In many processor architectures, in each retirement cycle the entire retirement logic is active such that all associated data is read from all associated arrays and the fall retirement logic is invoked for each instruction. All this activity is aimed at producing a guarantee signal and performing retirement related operations including event calculation and prioritization.

However, in most cycles no events occur and therefore there is no need to calculate the events. As such, there is significant power consumption that is not needed for proper operation.

DETAILED DESCRIPTION

Figure 1:
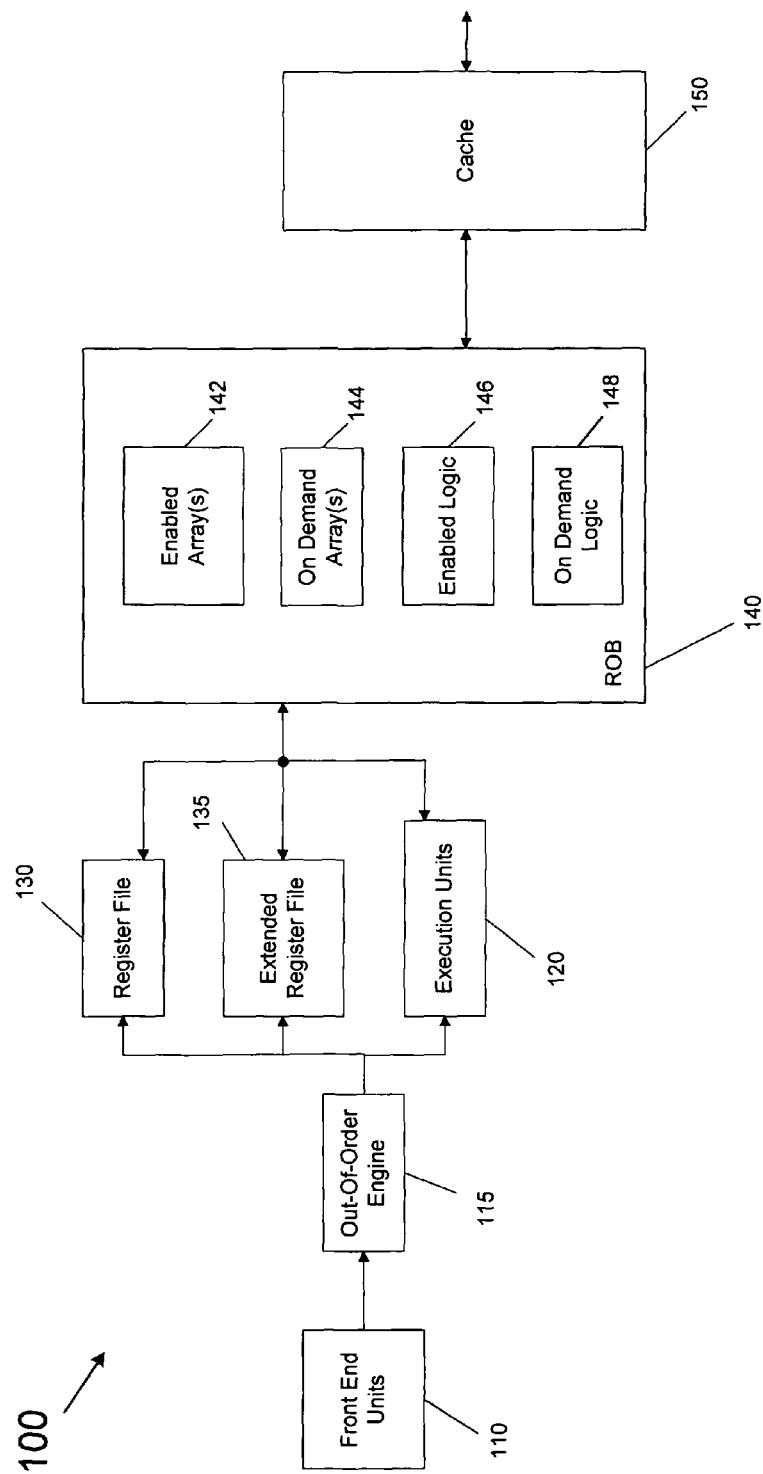
FIG. 1 is a block diagram of a processor in accordance with one embodiment of the present invention.

In various embodiments, retirement logic of a processor may be controlled to operate in a power sensitive manner by providing for partitioning of various retirement resources such that only a minimal amount of these resources can be powered for significant portions of operation. In this regard, various arrays, buffers or so forth, and logic can be partitioned to accommodate such operation. While embodiments described herein are in the context of a reorder buffer (ROB), the scope of the present invention is not limited in this regard and embodiments can be used with various retirement logic that may be present in a given processor.

To achieve power advantages, the partitions of such arrays and logic associated with normal retirement activities that are to occur in each retirement window may be relatively small such that minimal power is consumed. In contrast, for the relatively rare occasions in which additional calculations associated with various events need to be implemented in retiring instructions, larger arrays and logic can be powered. In this way, desired operations can be performed as needed, while for the majority of retirement operations, only minimal retirement logic need be powered. While described herein generally as instruction retirement, it is to be understood that in various embodiments, instructions may refer to so-called micro-operations (flops), in which a single user-level instruction such as a macro instruction can be broken up into a plurality of μops.

A ROB performs retirement related control such as exception handling, instruction pointer (e.g., EIP/UIP) calculation, performance monitor (PMON) calculations, and register update. Other than detecting faults, the ROB has other normal retirement related tasks performed when no faults are detected and are performed at retirement. These tasks include operations performed following a valid retirement such as writing new retired values into non-renamed registers, calculating status bits and updating new values (like data breakpoint bits, command and status register exceptions, precision exceptions or so forth) and updating performance monitors. A power aware retirement scheme in accordance with an embodiment of the present invention can selectively control the different power hungry blocks of the ROB only when needed, based at least in part on static and dynamic information derived from both external and internal (with respect to the ROB) indications.

In other words, mainstream tasks of normal retirement that draw a minimal amount of power can be handled by partitions of arrays and logic, leaving the rare cases like event handling (e.g., faults, traps, exceptions, interrupts) to be handled by a fuller partition of such arrays and logic only when needed. In this way, special modes like PMONs that need to operate in full performance environment can operate normally when needed, and save power when not active. Embodiments may thus allow larger retirement width when in frequency uninterruptible retirement by reducing the amount of calculation to realize instruction retirement.

Referring now to FIG. 1, shown is a block diagram of a processor in accordance with one embodiment of the present invention. As shown in FIG. 1, processor 100 may be a multi-stage pipelined out-of-order processor. Processor 100 is shown with a relatively simplified view in FIG. 1 to illustrate various features used in connection with power aware retirement operations as will be described below.

As shown in FIG. 1, processor 100 includes front end units 110, which may be used to fetch macro-instructions to be executed and prepare them for use later in the processor. For example, front end unit 110 may include an instruction prefetcher, an instruction decoder, and a trace cache, along with micro-code storage as well as an μop storage. The instruction prefetcher may fetch macro-instructions from memory and feed them to the instruction decoder to decode them into primitives, i.e., μops for execution by the processor. The trace cache may take decoded μops and assemble then into program ordered sequences for storage into the macro code storage. However, in the case of complex macro-instructions, the micro-code storage may provide the μops needed for the execution of the operation. Of course, additional components and features may be implemented in front end units 110.

Coupled between front end units 110 and execution units 120 is an OOO engine 115 that may be used to receive the micro-instructions and prepare them for execution. More specifically OOO engine 115 may include various buffers to re-order micro-instruction flow and allocate various resources needed for execution, as well as to provide renaming of logical registers onto storage locations within various register files such as register file 130 and extended register file 135. Register file 130 may include separate register files for integer and floating point operations. Extended register file 135 may provide storage for vector-sized units, e.g., 256 or 512 bits per register.

Various resources may be present in execution units 120, including, for example, various integer, floating point, and single instruction multiple data (SIMD) logic units, among other specialized hardware. Results may be provided to retirement logic, namely a reorder buffer (ROB) 140 which may operate in a power aware manner. More specifically, ROB 140 includes various arrays and logic to receive information associated with instructions that are executed. This information is then examined by ROB 140 to determine whether the instructions can be validly retired and result data committed to the architectural state of the processor, or whether one or more exceptions occurred that prevent a proper retirement of the instructions. Of course, ROB 140 may handle other operations associated with retirement, such as the various events and calculations described herein.

As shown in FIG. 1, ROB 140 may include various arrays, including one or more enabled arrays 142 and one or more on demand arrays 144. The enabled arrays may be always powered on and may include a minimal amount of information associated with instructions. As will be discussed further below, in one particular implementation separate partitions of an allocation array and a writeback (WB) array may correspond to enabled array 144. Similarly, on demand array 144 may be partitions of such arrays that include additional information associated with μops, and which only may be powered on if needed for handling events associated with a given instruction. As further shown in FIG. 1, ROB 140 further includes enabled logic 146. Such enabled logic may be always active and may be used to handle normal instruction retirement operations. In contrast, on demand logic 148 may only be enabled as required to handle events beyond normal retirement, such as handling of faults, interrupts, branch mispredictions, performance monitoring and updating and so forth. As shown in FIG. 1, ROB 140 is coupled to a cache 150 which, in one embodiment may be a low level cache (e.g., an L1 cache) although the scope of the present invention is not limited in this regard. Also, execution units 120 can be directly coupled to cache 150. From cache 150, data communication may occur with higher level caches, system memory and so forth. While shown with this high level in the embodiment of FIG. 1, understand the scope of the present invention is not limited in this regard.

In general operation, the ROB determines if the μops of a retirement window require reading of a specific portion of the ROB arrays or requires a specific logic to be enabled (where the specific resources are power hungry, and perform operations beyond normal retirement). This determination can be statically detected upfront during allocation, or dynamically detected on WB. For example, if no static events (at allocation) or dynamic events (on writeback (WB)) are detected, then there is no need to activate the event logic. Also, if PMON collection is not active, then this state can be detected statically on allocation and the data associated with PMON calculation should not be read at retirement and the logic that calculates PMON values need not be enabled.

Unless the specific operations are identified and specifically enabled, the ROB will normally focus on the mainstream activities of normal retirement. Such a power aware scheme will normally enable only the logic needed for eventless and normal μop retirement and powering off all other logic until a need for it is identified.

To enable a power aware ROB, embodiments may split various resources such as arrays into two sections: one that is read for every retirement and the other that is read only on demand (e.g., for PMON operation, interrupts, faults and so forth). Then, logic to identify which part of each array will be read for each type of capabilities (e.g., event only, PMON only, etc.) may be used to power the appropriate resource. Still further, the retirement logic can be partitioned such that each part will be specifically enabled when the type associated with that kind of operation retires.

In the normal case, when no speculative event is detected a guarantee signal for a retirement window to indicate that the μops can be validity retired without fault or exception, can be immediately active when the μops are valid for retirement and there is to be no calculation by the fault logic. Therefore it can be released faster, e.g., by one or more cycles, and thus may be referred to as an early guarantee signal. However, when a speculative event is detected, the early guarantee is not produced at such time and instead a (late) guarantee signal, or nuke or invalid signal to indicate that the μops cannot be validity retired will be produced by the on demand-enabled logic.

Figure 2:
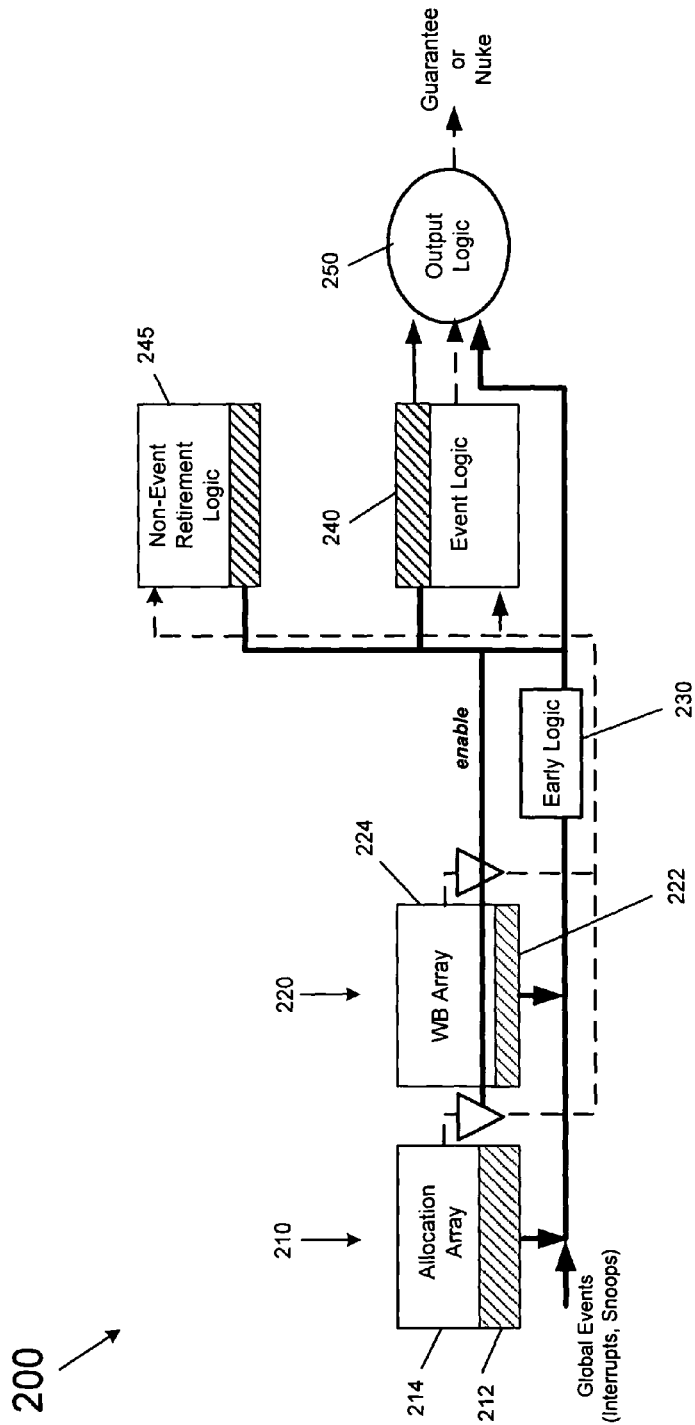
FIG. 2 is a block diagram of retirement logic in accordance with one embodiment of the present invention.

Referring now to FIG. 2, shown is a block diagram of retirement logic in accordance with one embodiment of the present invention. As shown in FIG. 2, a retirement unit 200, which may correspond to a ROB, may have various resources that are partitioned into multiple portions, where a first partition may be always enabled to perform operations during each retirement window and a second partition that may only be intermittently enabled as needed for handling retirements having various events associated with them. As shown in FIG. 2, retirement unit 200 includes an allocation array 210. Allocation array 210 may receive incoming information associated with μops at their allocation. While the scope of the present invention is not limited in this regard, such information may correspond to static information associated with the μops, such as the type of operation (branch, load, store, floating point (FP), or integer operation) or the type of exception associated with the μop. As shown in FIG. 2, allocation array 210 may be partitioned into a first partition 212 that may be configured to always be active, and a second partition 214 that is only enabled as needed (i.e., on demand). As shown, the relative size of first partition 212 may be much smaller than that of second partition 214. Thus the always powered part can be made relatively small, reducing power consumption. To that end, only a minimal amount of information for each μop may be stored in first partition 212. For example, a single bit for each μop may be stored to indicate whether additional information of the μop is present in second partition 214. Thus if a μop appears to be a μop that can be normally retired without any type of event processing, the associated bit in first partition 212 may be of a first state (e.g., logic zero), while if of a second state (e.g., logic 1), this indicates that additional information associated with the μop is present in second partition 214.

Similarly, writeback (WB) array 220 may be coupled to receive information at writeback associated with μops. Thus upon execution of a given μop in an execution unit, various result information, including calculated values, as well as status flags or other such information, including fault or other exception information, may be provided to WB array 220. As shown in FIG. 2, WB array 220 is also partitioned into two parts, namely a first partition 222 and a second partition 224. These partitions may store information in the same manner discussed above regarding allocation array 210.

Referring still to FIG. 2, an early logic 230 may be coupled to both of arrays 210 and 220 and to receive enable signals therefrom. As further shown in FIG. 2, early logic 230 may be coupled to receive global event information from other portions of the processor. While the scope of the present invention is not limited in this regard, such global events may correspond to interrupts, snoops, or other such events. Early logic 230 may be configured to receive this information and determine whether an early guarantee signal can be generated. That is, if no global events associated with a retirement window are received, and the values from the enabled first partitions of arrays 210 and 220 indicate that no information associated with the μops of the retirement window are present in the second partitions, this means that there are no events to be handled, and a normal retirement can be performed. Accordingly, early logic 230 generates the early guarantee signal, which as will be discussed further below is provided to an output logic 250. In this way, early logic 230 essentially acts as an OR logic.

If instead any of these various inputs to early logic 230 indicate that the early guarantee signal cannot be generated, the second partitions of arrays 210 and 220 may be activated such that information corresponding to the retirement window from these arrays can be sent to an event logic 240, which generally refers to logic to perform retirement related operations.

Event logic 240 thus may be enabled when the early guarantee signal cannot be generated so that event processing associated with the retirement window can be performed. Still further, based upon the information present in the second partition, non-event retirement logic 245 may be powered on to perform retirement related operations such as an instruction pointer update due to a mispredicted branch, or a PMON indication received on allocation or retirement. While not shown for ease of illustration in the embodiment of FIG. 2, understand that in various implementations, event logic 240 may itself be partitioned into various portions such that only the minimal portion of such logic to handle a given type of retirement or event processing can be activated. Thus when information indicates a need for a given portion of event logic 240 to handle event processing, only that portion of logic 240 may be powered.

Event logic 240 may generate an output that is provided to output logic 250. This output may correspond to a guarantee signal if the calculation indicates that the retirement window is valid. Note that this guarantee signal may be considered a late guarantee signal that is generated one or more cycles after the early guarantee signal that can be generated in early logic 230. If, based on the calculations performed in event logic 240 it is determined that the retirement window cannot be validly retired, e.g., due to a fault, interrupt, misprediction or so forth, an invalid or nuke signal instead may be sent to output logic 250 and a retirement will be handled by a different logic that will operate in program order but may operate at a different rate than the original rate (i.e., a single μop retired per clock vs. four μops retired per clock when a normal retirement rate is used).

Output logic 250, which may be a finite state machine (FSM), may thus receive these various signals from early logic 230 and event logic 240. Output logic 250 may act to serialize these various signals such that they issue from output logic 250 in program order. That is, rather than the out of order execution of instructions, output logic 250 may ensure that an early guarantee signal, which may be received one or more cycles earlier than a guarantee or invalid signal from event logic 240 for an earlier retirement window, does not issue ahead of such signal. In other words, output logic 250 outputs signals for each retirement window in order, whether such signals originated in early logic 230 or event logic 240.

In various embodiments, output logic 250 may be coupled to various other resources of a processor, such as control logic and so forth, to enable the valid commitment of execution results to the architectural state of the processor if a guarantee signal is generated, and to cause appropriate fault for other exception handling, including potential flushing of various processor resources, if instead an invalid signal is generated.

Thus as shown in FIG. 2, the various arrays are partitioned into first partitions that are always read and second partitions that are selectively read. Similarly, the logic of retirement unit 200 may also be split into logic that is always active and used to determine whether an event occurred associated with a retirement window, and if so, what additional retirement logic should be enabled. While shown with this particular implementation in the embodiment of FIG. 2, the scope of the present invention is not limited in this regard.

Thus in summary of operation, at allocation, static information defining which partition needs to be read can be calculated and stored in allocation array 210, and more specifically first partition 212. Similar operation is performed on WB information, and which can be stored in WB array 220, and more specifically first partition 222. Then at retirement, the information is read and the decision on which array to read and which logic to enable is made by early logic 230. In addition, external events such as interrupts or snoops can also be checked by early logic 230 to determine if another array or logic needs to be enabled. In case a task that needs to be performed is identified and it requires additional information from one of the arrays that were not read, then the specific part of allocation or WB arrays are read and the additional logic to perform this task is enabled.

Figure 3:
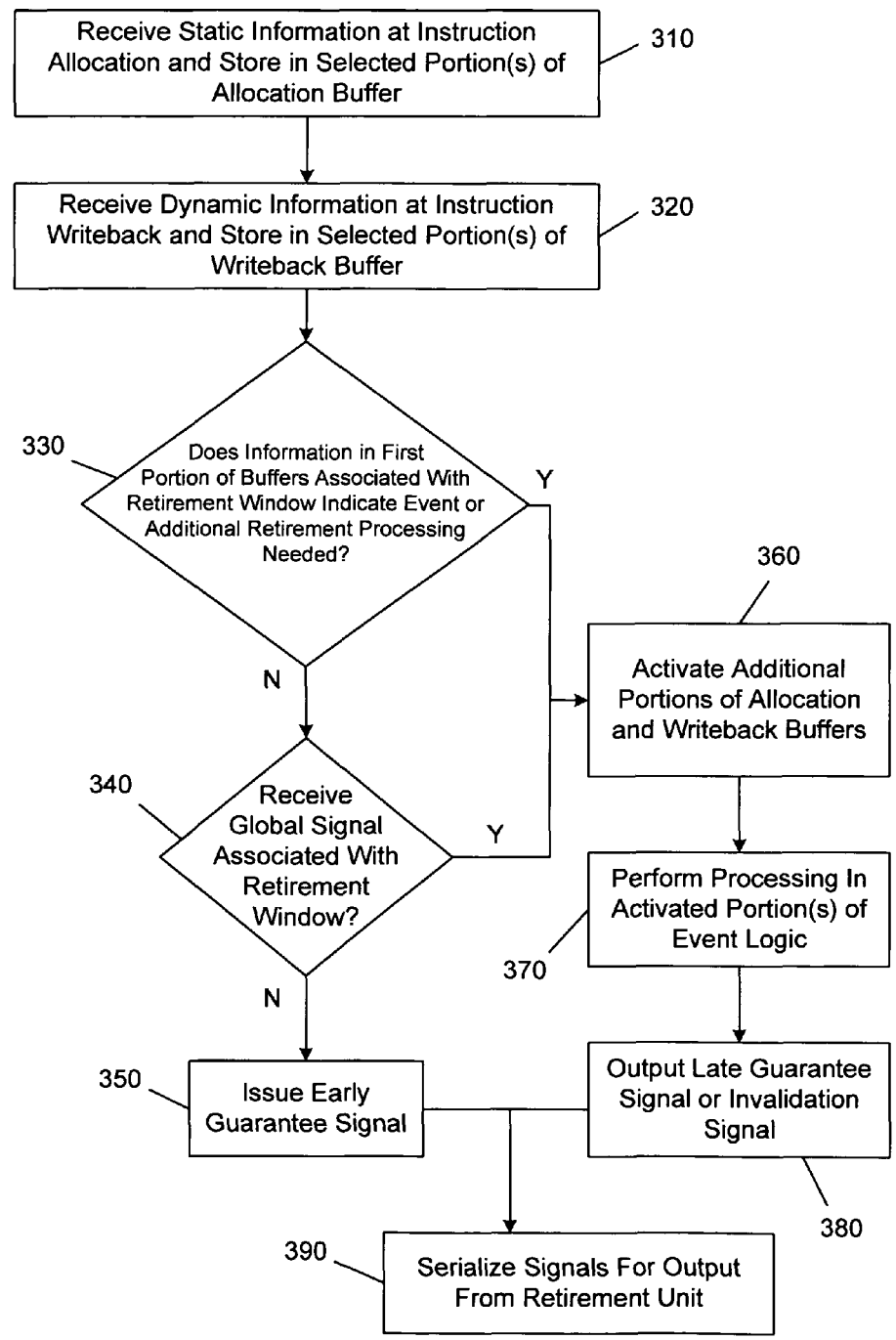
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 may be used to retire instructions in a power aware manner. Method 300 may begin by receiving static information at instruction allocation and storing such information in selected portions of an allocation buffer (block 310). For example, as discussed above if this static information indicates that a fault or exception is unlikely, an indicator such as a single bit may be set in a smaller, first portion of the allocation buffer to indicate that no additional information associated with the instruction is present in a second portion of the allocation buffer. If instead the static information indicates that additional processing is likely needed at retirement, e.g., due to a fault, performance monitoring or other reason, the indicator may be set to indicate that additional information is present in the second partition. Similar operations may occur with regard to dynamic information received at instruction writeback and which is stored in a similarly arranged writeback buffer (block 320).

Referring still to FIG. 3, at diamond 330 it may be determined (at retirement) whether the information in the first portions of the buffers associated with a given retirement window indicates that additional retirement or event processing is needed. That is, based on the state of the corresponding indicators in the first portion, it may be determined whether such retirement processing (e.g., IP updating or performance monitoring) or event processing, e.g., various calculations, fault or interrupt processing or so forth may be needed. If not, control passes to diamond 340 where it may be determined whether a global signal is received that is associated with the retirement window. As discussed above, such global signal may correspond to an interrupt, snoop or other global event. If no such signal is received, early logic, for example, may issue an early guarantee signal (block 350).

Referring still to FIG. 3, if instead it is determined that additional retirement or event processing is needed or a global signal has been received, control passes from either diamond 330 or 340 to block 360, where additional portions of the allocation and writeback buffers may be activated. Control then passes to block 370, where such processing may be performed in one or more activated portions of event logic. As discussed above, based on the additional information provided, various retirement or event logic may be enabled to perform various calculations or other processing to determine whether a late guarantee signal can be generated. Accordingly, the output of the event logic may be a late guarantee signal or an invalidation (e.g., nuke) signal (block 380).

As further shown in FIG. 3, from both of blocks 350 and 380, control passes to block 390, where the various signals may be serialized for output from the retirement unit. That is, to maintain serialization of retirement windows, an early guarantee signal generated for a later retirement window is prevented from going ahead of a late guarantee or invalidation signal associated with the earlier retirement window. While shown with this particular implementation in the embodiment of FIG. 3, the scope of the present invention is not limited in this regard.

For example, if it is determined that special treatment is needed on retirement, retired μops can be handled differently than normally. Assume that 8 μops are usually retired in case no event is present. When an event is detected in the retirement window, each μop can instead be separately retired such that only a single set of event logic is needed for a single μop. This may give further power reduction and even performance if retirement is faster. However, retirement operation after it is decided to activate certain logic may be at a different rate than the original rate.

One example of an event that is no longer needed may be a sticky bit that is set. As such, there is no need to set it again, and thus event logic to perform this duplicative setting need not be enabled. Another such case is adding early signals to identify a fault-less operation early enough such that the operation associated with it will not be performed. For example, a floating point (FP) operation can be declared safe early enough such that no exception handling logic will be enabled. In cases such as for PMON handling and coprocessor state storage, the ROB will read the data arrays it holds, perform the tasks associated with the operation but it will not check for faults and activate the logic associated with it in case no fault was detected.

Figure 4:
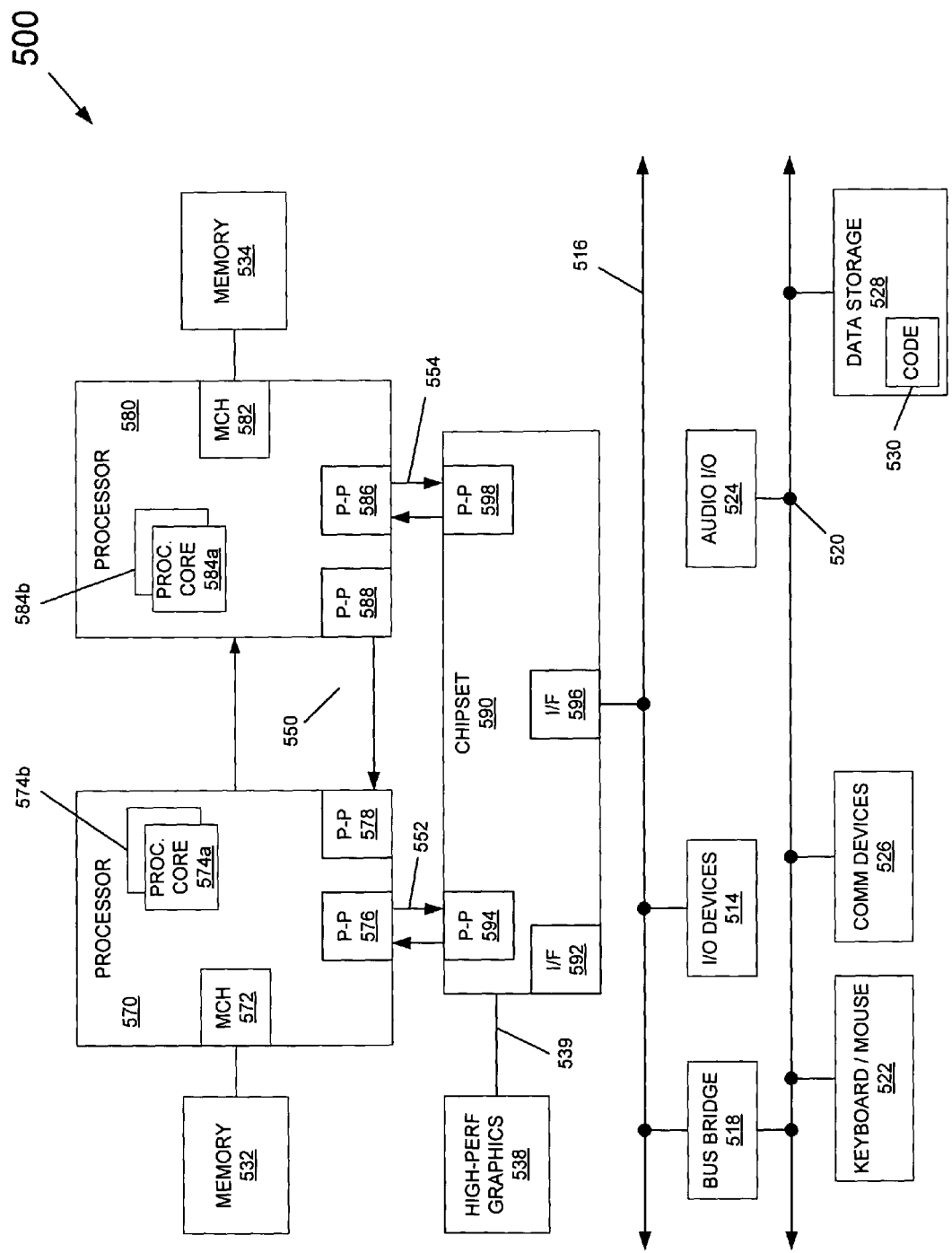
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each processor core may include logic such as shown in FIGS. 1 and 2 to enable power aware retirement in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538 using interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a retirement unit to retire instructions after execution, the retirement unit including:
a first array to receive first information at allocation of the instructions, the first array partitioned into a first portion to be always read at each retirement window and a second portion to be only read at each retirement window when determined by the retirement unit;
a second array to receive second information after execution of the instructions, the second array partitioned into a first portion to be always read at each retirement window and a second portion to be only read at each retirement window when determined by the retirement unit; and
demand logic to calculate an event associated with an executed instruction if information associated with the executed instruction is stored in the second portion of the first array or the second portion of the second array.

2. The apparatus of claim 1, wherein the demand logic is to generate a guarantee signal for an executed instruction if a calculation indicates that the executed instruction does not have a fault, and to generate an invalidation signal if the fault is indicated.

3. The apparatus of claim 2, further comprising early logic coupled to outputs of the first and second arrays and to output an early guarantee signal for a first executed instruction based on information in the first portion of the first and second arrays.

4. The apparatus of claim 3, wherein the early logic is further coupled to receive global event information and activate the demand logic responsive thereto.

5. The apparatus of claim 4, wherein the early logic is to activate the second portion of the first array based on a state of an indicator corresponding to the retirement window present in the first portion of the first array.

6. The apparatus of claim 3, further comprising output logic coupled to the demand logic and the early logic to serialize the early guarantee signal and the guarantee signal or the invalidation signal.

7. The apparatus of claim 1, wherein the first array comprises an allocation array and the second array comprises a writeback array.

8. The apparatus of claim 7, wherein the second portions of the first and second arrays are to be powered off unless the demand logic is active.

9. A method comprising:
receiving static information associated with an instruction at instruction allocation and storing at least a first portion of the static information in a first portion of an allocation buffer, and storing a second portion of the static information in a second portion of the allocation buffer if the static information is indicative of an event processing to be performed at retirement;
issuing an early guarantee signal at retirement of the instruction if the second portion of the static information associated with the instruction is not present in the second portion of the allocation buffer, wherein the second portion of the allocation buffer is powered off; and
otherwise powering on the second portion of the allocation buffer to access the second portion of the static information.

10. The method of claim 9, further comprising performing the event processing in event logic that is powered if the early guarantee signal is not issued.

11. The method of claim 10, further comprising generating a late guarantee signal or an invalidation signal in the event logic based on a result of the event processing.

12. The method of claim 11, further comprising serializing for output from a retirement unit an early guarantee signal associated with a first instruction and a late guarantee signal or an invalidation signal associated with a second instruction, the second instruction earlier in program order than the first instruction.

13. The method of claim 9, further comprising receiving dynamic information associated with the instruction at instruction writeback and storing at least a first portion of the dynamic information in a first portion of a writeback buffer, and storing a second portion of the dynamic information in a second portion of the writeback buffer if the dynamic information is indicative of an event to be performed at retirement.

14. The method of claim 13, further comprising determining based at least in part on the first portion of the static information and the first portion of the dynamic information whether event processing is to be performed at retirement, and performing the event processing at retirement, wherein the retirement is to occur at a different rate when the event processing is to be performed than when the event processing is not to be performed.

15. A system comprising:
a processor to execute instructions out-of-order (OOO), the processor including a plurality of execution units and a retirement unit coupled to the plurality of execution units, wherein the retirement unit includes:
an allocation buffer to receive first information at allocation of the instructions, the allocation buffer partitioned into a first portion to be always read at each retirement window and a second portion to be only read at each retirement window when determined by the retirement unit;
a writeback buffer to receive second information after execution of the instructions, the writeback buffer partitioned into a first portion to be always read at each retirement window and a second portion to be only read at each retirement window when determined by the retirement unit;
a first logic coupled to outputs of the allocation buffer and the writeback buffer and to output an early guarantee signal for a first executed instruction if no first or second information associated with the first executed instruction is present in the second portion of the allocation buffer or the second portion of the writeback buffer; and
a second logic coupled to outputs of the allocation buffer and the writeback buffer and to output a late guarantee signal or an invalidation signal for a second executed instruction if first or second information associated with the second executed instruction is present in the second portion of the allocation buffer or the second portion of the writeback buffer; and
a dynamic random access memory (DRAM) coupled to the processor.

16. The system of claim 15, wherein the first logic is to receive a global event signal and activate the second logic during retirement of a third executed instruction responsive to the global event signal.

17. The system of claim 15, further comprising a third logic coupled to the first logic and the second logic and to combine outputs of the first logic and the second logic.

18. The system of claim 17, wherein the third logic is to serialize for output from the retirement unit the late guarantee signal or the invalidation signal ahead of the early guarantee signal, wherein the second executed instruction is earlier in program order than the first executed instruction.

19. The system of claim 15, wherein the first portion of the allocation buffer and the writeback buffer are to be powered during each retirement window, and the second portion of the allocation buffer is to be powered during a retirement window only if information associated with the retirement window is stored in the second portion of the allocation buffer.

20. The system of claim 15, wherein the first logic is to output the early guarantee signal and the second logic is not powered during a retirement window, wherein a sticky bit is set prior to the retirement window and need not be set by the retirement unit.

* * * * *